Dec. 10, 1968  F. J. WALKER  3,415,577
VEHICLE BRAKING SYSTEMS
Filed April 11, 1967  2 Sheets-Sheet 2

Inventor
FREDERICK J. WALKER
By Mason, Fenwick & Lawrence
Attorneys

United States Patent Office 3,415,577
Patented Dec. 10, 1968

3,415,577
VEHICLE BRAKING SYSTEMS
Frederick J. Walker, Kenilworth, England, assignor to Harry Ferguson Research Limited, Abbotswood, Stow-on-the-Wold, Gloucestershire, Great Britain
Filed Apr. 11, 1967, Ser. No. 630,083
Claims priority, application Great Britain, Apr. 15, 1966, 16,555/66
8 Claims. (Cl. 303—21)

The invention relates to vehicles and to braking systems therefor.

In co-pending application No. 612,053 there are disclosed vehicle braking systems including inertia operated anti-skid means responsive on excessive deceleration of the vehicle transmission to release the wheel brakes.

It is an object of the present invention to enable such braking systems to take account of variations in road conditions during anti-skid operation.

According to the invention there is provided a vehicle having a servo-assisted braking system, an anti-skid device operable in response to inertia changes, and valve means interposed in the servo system and operatively connected to said anti-skid device whereby on operation of the latter said valve means is operated to sequentially reduce, remove and reverse the servo-assistance to decrease the braking effect, and a pressure responsive control valve interposed between said valve means and said servo-mechanism and operable to control fluid flow from the latter to the former subsequent to antiskid operation, to thereby control re-application of the brakes.

An embodiment of the invention will now be described, by way of example only, with reference to the accompanying drawings, in which.

Figure 1:
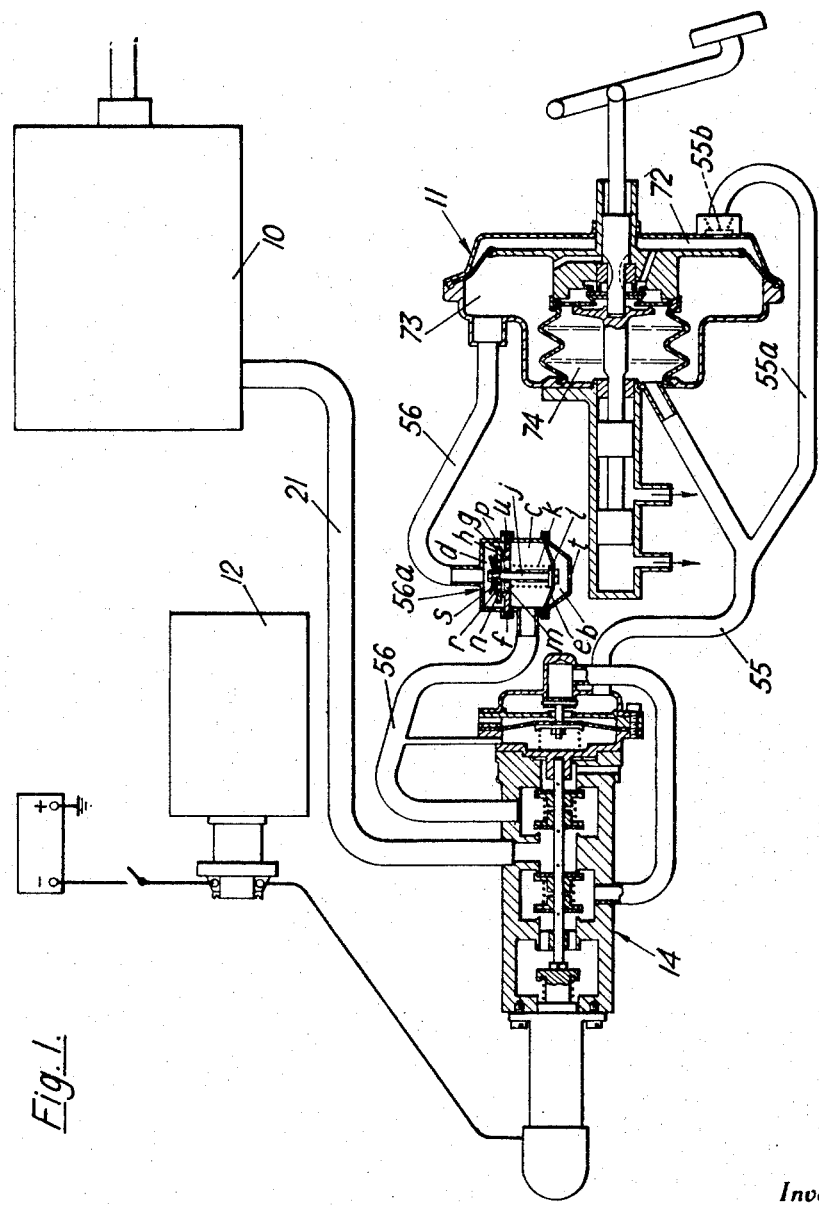
FIG. 1 illustrates a suspended-vacuum, servo-assisted braking system similar to that shown in FIG. 2 of application No. 612,053 but incorporating the present invention.
Figure 2:
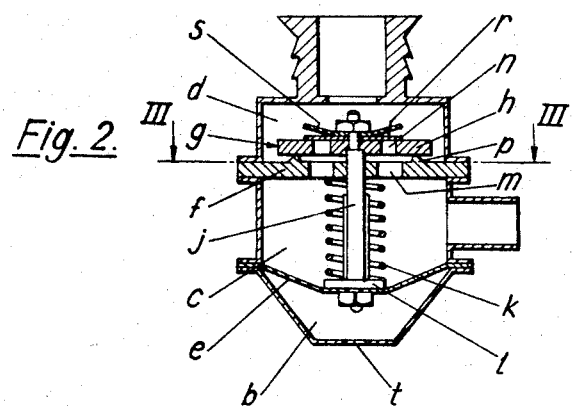
FIG. 2 is a cross-section through the pressure-responsive control valve.

Referring to the drawings, the braking system shown in FIG. 1 is identical in construction and operation to that illustrated in FIG. 2 of application No. 612,053 save in the provision of a pressure responsive control valve 56a in the pipe 56 between the change-over valve 14 and the chamber 73 of the brake-applying means 11, and a connection 55a between the pipe 55 and the chamber 72 of the brake-applying means. The reference numerals referring to parts disclosed in application No. 612,053 are the same as those used in that application.

The valve 56a includes three chambers b, c and d, the chambers b and c being separated by a flexible diaphragm e and the chambers c and d being separated by a valve plate f. A valve g has a head h carried on a stem j which passes through the valve plate f and is connected to the diaphragm e. A spring k acts between the valve plate f and an abutment disc 1 secured to the valve stem j.

Figure 3:
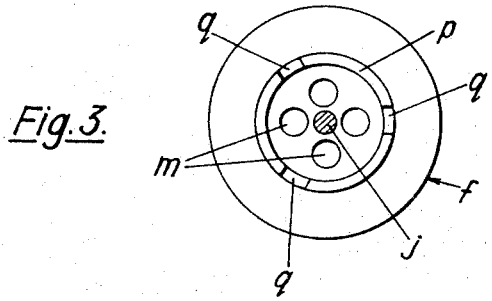
FIG. 3 is a section on line III—III of FIG. 2.

Apertures m and n are provided in the valve plate f and valve head h respectively and an annular ridge or seat p is formed on the valve plate for engagement with the valve head h to close the valve. Closure is not complete however, due to the provision of three equispaced V-slots q (FIG. 3) in the seat p. A one-way flap valve r controls the apertures n in the valve head and is provided with a stop plate s to limit its movement.

In operation, the chamber b is open to air at atmospheric pressure at all times through an aperture t. The chamber c is connected to the change-over valve 14 and the chamber d to the chamber 73 of the brake-applying means 11. The pressure in the chamber b is always atmospheric, but the pressures in the chambers c and d vary during anti-skid operation, and the valve 56a is operated in accordance with variations in pressure as between the three chambers b, c and d.

Taking the condition where the brakes are off, as explained in application No. 612,053, the pipe 56 is connected to the vacuum tank 10 and the pipe 55 to atmosphere. In the present example, in this condition the vacuum in the chamber 73 is greater than 10″ hg. vacuum and as this is the pressure in both chambers c and d, the atmospheric pressure in chamber b is effective to open the valve. During normal application of the brakes the pressure in the chamber 73 does not alter appreciably and the valve 56a remains open. Thus in these conditions the operation of the system is no different from that in application No. 612,053.

During anti-skid operation, the change-over valve 14 is effective to connect the pipe 56 to atmosphere and the pipe 55 to the vacuum tank 10. At the instant at which this occurs, the pressure in chamber 73 starts to rise and the extent to which it rises depends on the length of time for which the rotary-inertia device 12 is in operation.

Under dry road conditions where there is a good coefficient of friction between the tyres and the road, release of the brakes causes the transmission to speed up again quickly and the brakes can then be quickly reapplied. The period of time between actuation and release of the change-over valve is therefore very short and the vacuum pressure in the chamber 73 does not fall below 10″ hg. vacuum before the change-over valve is released. Thus the valve 56a remains open and the brakes are quickly reapplied.

However under slippery road conditions it is desirable that the re-application of the brakes should be slowed down to enable the wheels to regain speed after operation of the rotary inertia device. During anti-skid operation under such conditions the transmission does not speed up so quickly and hence the chamber 73 is connected to atmospheric pressure long enough to allow the vacuum pressure in the chamber 73 to fall below 10″ hg. vacuum. In these circumstances the pressure differential between the chambers b and c of the valve 56a is such that the pressure in chamber c together with the spring k act to close the valve.

As the vacuum pressure continues to fall (i.e. the pressure in chamber 73 rises) the valve 56a remains closed though there is no restriction of air flow through the valve as the flap valve r opens to permit this. When the transmission has decelerated to an extent sufficient to render anti-skid operation unnecessary, the rotary inertia device becomes inoperative, the change-over valve is released, and the pipes 55 and 56 are again connected to the atmosphere and the vacuum tank 10 respectively. However, withdrawal of air from the chamber 73 is restricted as the valve 56a remains closed and thus air can only leave the chamber 73 through the V-slots q. Thus the re-application of the brakes is delayed. This prevents sudden reapplication which might lead to further locking and thus permits gradual controlled braking suited to the slippery conditions. Once the vacuum pressure in the chamber 73 is greater than 10″ hg. vacuum the valve 56a opens and normal braking can be effected.

Thus under normal road conditions when the surface is dry and the anti-skid device operates, rapid re-application of the brakes is permitted, but in slippery conditions re-application of the brakes after anti-skid operation is gradual and controlled. The valve 56a senses the different road conditions by means of the value of vacuum in the chamber 73 of the brake-applying means 11 during anti-skid operation.

In FIG. 1 the valve 56a includes a narrow restrictor hole u in the valve plate f. This permanently connects the chambers *c* and *d* and operates in a similar manner to the V-slots *q*.

While in the embodiment the valve 56a is arranged to close when the vacuum pressure in the chamber 73 is less than 10″ hg. vacuum it should be appreciated that this figure is given only as an example and the valve may be arranged to close at a different pressure. Moreover, the valve 56a may be used to control re-application of the brakes in a servo-assisted braking system having a different anti-skid arrangement from that referred to above.

The connection 55a is provided to speed up expulsion of air from chamber 72 during anti-skid operation; otherwise air has to be expelled through the various passages in the valve body 62 of the brake applying means 11 and through the chamber 74 and pipe 55. The connection 55a includes a non-return valve 55b which closes the connection from the chamber 72 when the brakes are off, there then being vacuum in chamber 72 and atmospheric pressure in connection 55a. When the brakes are applied the degree of vacuum in chamber 72 is lowered and during anti-skid operation the degree of vacuum is increased through chamber 74 and connection 55a.

In modifications the vacuum servo-mechanism may be replaced by a hydraulic servo-mechanism and the anti-skid device may operate in response to changes in linear inertia instead of rotary inertia.

I claim:

1. A vehicle having a servo-assisted braking system, an anti-skid device operable in response to inertia changes, and valve means interposed in the servo system and operatively connected to said anti-skid device whereby on operation of the latter said valve means is operated to sequentially reduce, remove and reverse the servo-assistance to decrease the braking effect, and a pressure responsive control valve interposed between said valve means and said servo-mechanism and operable to control fluid flow from the latter to the former subsequent to anti-skid operation, to thereby control re-application of the brakes.

2. A vehicle according to claim 1 in which said control valve includes first and second chambers respectively connected to said valve means and to said servo-mechanism and separated by a valve plate, and a valve member movable into engagement with said valve plate to control fluid flow between said first and second chambers.

3. A vehicle according to claim 2 in which said valve member is movable by a flexible diaphragm to which the valve plate is attached and which is continuously acted on by fluid at high pressure to bias the valve to open position.

4. A vehicle according to claim 3 in which said control valve incorporates a one-way flap valve enabling free flow of high pressure fluid from said valve means to said servo-mechanism when said valve member is closed, and restriction means permitting restricted flow of high pressure fluid from said servo-mechanism to said valve means when said valve member is closed.

5. A vehicle according to claim 4 including spring means acting on said diaphragm against the force of said high pressure fluid, the spring strength being arranged such that when the pressure in said first chamber rises above a predetermined value during anti-skid operation, the pressure in the chamber and the spring force overcome the high pressure fluid acting on said diaphragm and move said valve member to closed position.

6. A vehicle according to claim 5 in which the servo-mechanism is a vacuum servo-mechanism and said predetermined value is approximately 10″ hg. vacuum.

7. For use in a servo-assisted vehicle braking system a pressure responsive control valve having the features of any preceding claim.

8. A vehicle according to claim 5 in which four wheels are engine driven through front and rear propeller shafts and front and rear axles composed of half-shafts, there being a differential gear between the front half-shafts, a differential gear between the rear half-shafts, and a controlled differential gear between the front and rear propeller shafts.

References Cited

UNITED STATES PATENTS

| | | | |
|---|---|---|---|
| 3,004,801 | 10/1961 | Wrigley | 303—21 |
| 3,093,422 | 6/1963 | Packer et al. | 303—21 |
| 3,265,446 | 8/1966 | Cripe | 303—21 |

DUANE A. REGER, *Primary Examiner.*

U.S. Cl. X.R.

188—181